United States Patent
Shapiro et al.

(10) Patent No.: US 8,545,681 B2
(45) Date of Patent: Oct. 1, 2013

(54) WASTE HEAT DRIVEN DESALINATION PROCESS

(75) Inventors: Andrew Philip Shapiro, Schenectady, NY (US); Nishith Vora, Bensalem, PA (US); Ching-Jen Tang, Watervliet, NY (US); AliciA Jillian Jackson Hardy, Schenectady, NY (US); Douglas Westerkamp, Highlands Ranch, CO (US)

(73) Assignee: General Electric Company, Schenectady, NY (US)

( * ) Notice: Subject to any disclaimer, the term of this patent is extended or adjusted under 35 U.S.C. 154(b) by 695 days.

(21) Appl. No.: 12/646,481

(22) Filed: Dec. 23, 2009

(65) Prior Publication Data

US 2011/0147195 A1 Jun. 23, 2011

(51) Int. Cl.
| | |
|---|---|
| C02F 1/04 | (2006.01) |
| C02F 1/06 | (2006.01) |
| C02F 103/08 | (2006.01) |
| B01D 1/26 | (2006.01) |
| B01D 3/06 | (2006.01) |
| B01D 61/08 | (2006.01) |
| F01K 17/02 | (2006.01) |
| F01K 23/10 | (2006.01) |

(52) U.S. Cl.
USPC ........... 203/10; 60/645; 159/2.1; 159/17.1; 159/24.2; 159/47.1; 159/46; 159/DIG. 8; 159/DIG. 20; 203/11; 203/22; 203/82; 203/84; 203/88; 203/DIG. 17; 203/DIG. 20; 203/DIG. 8; 210/652

(58) Field of Classification Search
USPC .............. 60/645; 159/2.1, 17.1, 24.2, 46, 159/47.1, DIG. 8, DIG. 22; 203/10, 11, 22, 203/25, 27, 82, 84, 88, DIG. 8, DIG. 17, DIG. 20; 210/652, 767, 774, 806
See application file for complete search history.

(56) References Cited

U.S. PATENT DOCUMENTS

| | | | |
|---|---|---|---|
| 1,620,163 A | * | 3/1927 | Milliff et al. ............... 208/352 |
| 4,083,781 A | | 4/1978 | Conger |

(Continued)

FOREIGN PATENT DOCUMENTS

| | | |
|---|---|---|
| EP | 1413554 A1 | 4/2004 |
| EP | 1701006 A2 | 9/2006 |

(Continued)

OTHER PUBLICATIONS

"Seawater Multi-effect Distillation Energized By A Combustion Turbine," by Victor Dvornikov, Elsevier Science B.V., 2000.*

(Continued)

*Primary Examiner* — Virginia Manoharan
(74) *Attorney, Agent, or Firm* — Wegman, Hessler & Vanderburg

(57) ABSTRACT

Disclosed is a process for improving the efficiency of a combined-cycle power generation plant and desalination unit. The process includes supplying exhaust gases from a gas turbine set used to generate electrical power to a heat recovery steam generator (HRSG) and then directing the steam from the HRSG to a steam turbine set. Salinous water is supplied into an effect of the desalination unit. Steam exhausted from the steam turbine set is utilized in the effect of the desalination unit to produce a distillate vapor and brine from the effect by heat exchange. Additionally, steam is introduced steam from at least one additional heat source from the combined-cycle power generation plant to the effect to increase the mass flow rate of steam into the effect. In one embodiment, the additional heat source is an intercooler heat exchanger. Heated water from the intercooler heat exchanger is provided to a reduced atmosphere flash tank, and the steam flashed in the flash tank is provided to the effect.

3 Claims, 2 Drawing Sheets

(56) References Cited

U.S. PATENT DOCUMENTS

| | | | |
|---|---|---|---|
| 4,094,747 | A | 6/1978 | Pfenninger |
| 5,329,758 | A | 7/1994 | Urbach et al. |
| 5,925,223 | A | 7/1999 | Simpson et al. |
| 6,804,962 | B1 * | 10/2004 | Prueitt .................. 60/641.8 |
| 7,922,873 | B2 * | 4/2011 | St. Germain et al. ......... 202/155 |
| 2003/0230534 | A1 | 12/2003 | Donaldson et al. |
| 2004/0103637 | A1 | 6/2004 | Maisotsenko et al. |
| 2004/0128976 | A1 | 7/2004 | Gralla |
| 2004/0237539 | A1 | 12/2004 | Mangin |
| 2006/0130487 | A1 | 6/2006 | Kashler |
| 2006/0157338 | A1 | 7/2006 | Eddington |
| 2006/0157410 | A1 * | 7/2006 | Hassan .................. 210/637 |
| 2007/0068161 | A1 * | 3/2007 | Kalina .................. 60/651 |
| 2007/0215453 | A1 | 9/2007 | Eddington |
| 2007/0240446 | A1 | 10/2007 | Holtzapple et al. |
| 2008/0190106 | A1 * | 8/2008 | Mak .................. 60/531 |
| 2009/0049836 | A1 | 2/2009 | Erickson et al. |
| 2009/0246002 | A1 | 10/2009 | Wakeman et al. |
| 2010/0038325 | A1 * | 2/2010 | Benson et al. ............. 210/766 |
| 2011/0137477 | A1 * | 6/2011 | Al-Mazeedi .................. 700/287 |

FOREIGN PATENT DOCUMENTS

| | | |
|---|---|---|
| GB | 1550741 A | 8/1979 |
| WO | 2007149879 A2 | 12/2007 |

OTHER PUBLICATIONS

"Comparison of Multiple Effect Distillation And Reverse Osmosis For New I Providence Island," by E. George Moss, Edwin T. Hunt and Curtis A. Kiefer, Pro osal, 1993.*

The WO Search Report issued in connection with corresponding International Application No. PCT/US2010/053647 on Dec. 30, 2010.

The WO Written Opinion issued in connection with corresponding International Application No. PCT/US2010/053647 on Dec. 30, 2010.

Tonner, J., "Reclamation—Managing Water in the West—Barriers to Thermal Desalination in the United States", Water Consultants International, Mequon, WI, U.S. Department of the Interior, Bureau of Reclamation, Mar. 2008.

* cited by examiner

WASTE HEAT DRIVEN DESALINATION PROCESS

BACKGROUND OF THE INVENTION

1. Field of the Invention

This invention relates generally to power generation and simultaneous desalinization of salinous water, and more specifically, to improving thermal efficiency by using other waste heat sources in addition the exhaust steam to heat water used in the desalination of salinous water.

2. Description of Related Art

Power generation using steam expansion is a common process. Condensate is fed to a boiler and heated. Steam is removed from the boiler and typically superheated. It then expands across a turbine, thereby doing work. The steam is then condensed and recycled to the boiler. A moderate amount of liquid is intermittently withdrawn from the boiler to prevent sludge accumulation. Treated fresh water is added to the system to compensate for material losses. Dual purpose desalination/power plants currently in use produce fresh water by using the exhaust steam as a source of heat for a distillation unit. Essentially, the power plant's condenser is replaced by the effect of distillation unit. This allows for the efficient production of fresh water.

When desalinization plants are integrated into gas turbine power plants, they are invariably incorporated as combined cycle power plants that utilize both gas and steam turbines. In combined cycle plants, electricity is produced with high-pressure steam, generated by heat exchange with gas turbine exhaust gases, to run turbines that in turn power electric generators. In a typical case, boilers produce high-pressure steam at about 540° C. (1,000° F.). As this steam expands in the turbine, its temperature and energy level is reduced. Distillation plants need steam having a temperature of about 120° C. (248° F.) or below, and this steam can be obtained by extracting lower temperature steam at the low pressure end of the turbine after much of its energy has been used to generate electricity. This low pressure steam is then run through the distillation plant's brine heater, thereby increasing the temperature of the incoming salinous water. The condensate from the extracted steam is then returned to the boiler to be reheated.

However, typical desalination plants in commercial application reduce electricity production from combined cycle power plants because they still extract relatively high-pressure steam that would otherwise be further expanded in the steam turbine. Additionally, they do not effectively utilize other waste heat sources in the distillation process. Accordingly, a need exists for a process that increases the efficiency for desalination in a combined cycle power plant.

SUMMARY OF THE INVENTION

In one aspect, the invention is directed to a process for improving the efficiency of a combined-cycle power generation plant and thermal desalination unit. The process includes supplying exhaust gases from a gas turbine set used to generate electrical power to a heat recovery steam generator (HRSG) and then directing the steam from the HRSG to a steam turbine set. Salinous water is supplied into a thermal desalination unit, whose processes could be single or multi-effect distillation, multi-stage flash, membrane distillation, or forward osmosis. The illustrated embodiment considers a thermal desalination process with single-effect distillation. Steam exhausted from the steam turbine set is utilized in an effect of the desalination unit to produce a distillate vapor and brine from the effect by heat exchange. Additionally, steam is introduced steam from at least one additional heat source from the combined-cycle power generation plant to the effect to increase the mass flow rate of steam into the effect. In one embodiment, the additional heat source is an intercooler heat exchanger. Heated water from the intercooler heat exchanger is provided to a reduced atmosphere flash tank, and the steam flashed in the flash tank is provided to the effect. In another embodiment, the additional heat source is an economizer heat exchanger in the HSRG. Heated water from the economizer heat exchanger is provided to a reduced atmosphere flash tank, and the steam flashed in the flash tank is provided to the effect.

Another aspect of the invention is directed to a combined-cycle power generation plant and desalination unit. The plant includes a gas turbine set having a compressor and a gas turbine with a combustor therebetween. The compressor has a high pressure compressor and a low pressure compressor, wherein an intercooler heat exchanger is positioned between the high pressure compressor and the low pressure compressor. The plant also includes a steam turbine set and a HRSG which is connected to and which receives hot exhaust gas from the gas turbine set. The HRSG provides steam to the steam turbine set. The desalinization unit for distilling salinous water has at least one effect that receives exhaust steam from the steam turbine set. The plant also includes a reduced atmosphere flash tank configured to receive heated water from the intercooler heat exchanger. A portion of the heated water from the intercooler heat exchanger is flashed to steam in the flash tank and is then provided to the effect of the desalinization unit to increase the mass flow rate of steam into the effect. In another embodiment, the plant also contains an economizer heat exchanger in the HSRG. Heated water from the economizer heat exchanger is provided to the reduced atmosphere flash tank. A portion of the heated water from the economizer heat exchanger is flashed to steam in the flash tank and is then provided to the effect of the desalinization unit to increase the mass flow rate of steam into the effect.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges included herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus.

The singular forms "a," "an" and "the" include plural referents unless the context clearly dictates otherwise.

Figure 1:
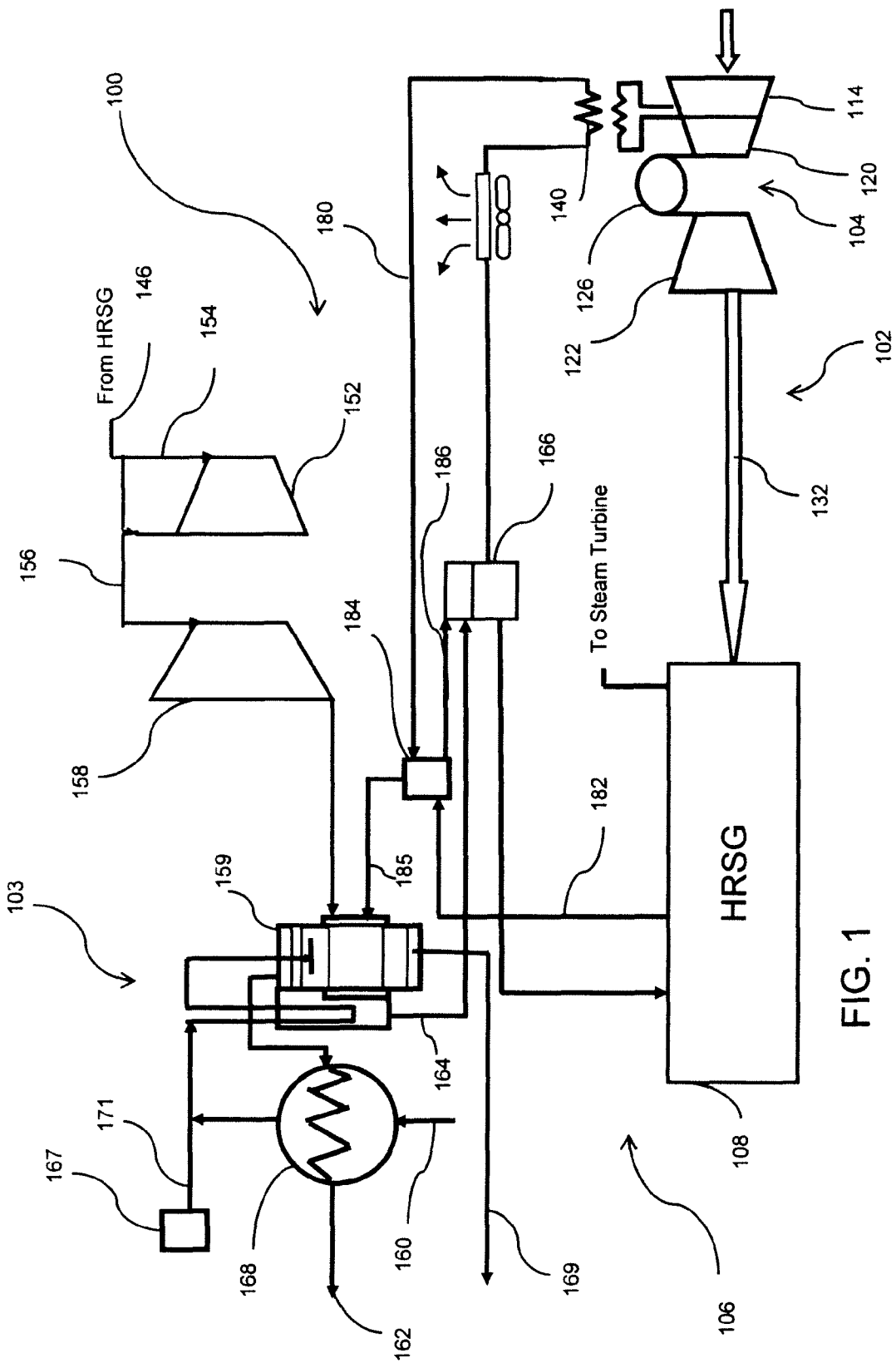
FIG. 1 is a schematic of combined-cycle power generation and desalination assembly in accordance with an embodiment of the invention.

FIG. 1 is a schematic illustration of an exemplary combined-cycle power generation plant and desalination unit 100 that includes a power generation plant 102 and a thermal desalination unit 103. All embodiments of the invention reduce displaced electricity from the combined cycle plant by utilizing waste heat streams for thermal desalination. In the illustrated embodiment, the power generation plant 102 includes a gas turbine plant 104 with a heat recovery portion 106 that includes a heat recovery steam generators (HRSG) 108. Although the embodiments herein use waste heat from the gas turbine power plant 104 to drive desalination, one skilled in the art will understand that the invention can also utilize the waste heat from industrial processes or from any type of power plant such as fossil-fired boilers, biomass-fired boilers, waste recovery boilers, waste incinerating furnaces, nuclear boilers, fuel cell power plants, geothermal sources, and solar sources.

In the exemplary embodiment, the gas turbine power plant 104 includes a low pressure compressor or booster 114 and a high pressure compressor 120 coupled to a turbine 122 through a shaft 124. A combustor 126 is coupled between high pressure compressor 120 and turbine 122, such that the outlet of the compressor 120 is coupled in flow communication with the inlet of the turbine 122 through the combustor 126. In operation, air flows through high pressure compressor 120 and compressed air is delivered to combustor 126. Exhaust gas flow from combustor 126 drives the turbine 122, which in turn drives an electrical generator (not shown) as is well known in the art. Depleted exhaust gases exit the turbine 122 through a turbine exhaust outlet 132 to the HRSG 108. The exhaust gases are channeled through passages in the HRSG 108 such that heat contained in the exhaust gases converts water flowing through HRSG 108 into steam. The exhaust gases are then discharged from HRSG 108 and released to the atmosphere or to a pollution control device (not shown). In one exemplary embodiment, gas turbine engine plant 104 is a model LMS 100 manufactured by General Electric Company.

In the exemplary embodiment, the gas turbine engine plant 104 includes an intercooler heat exchanger 140 that is positioned between the low pressure compressor 114 and the high pressure compressor 120 to facilitate reducing the temperature of the air entering the high pressure compressor 120. Using an intercooler heat exchanger 140 facilitates increasing the efficiency of the gas turbine engine plant 104 while reducing the quantity of work performed by the high pressure compressor 120. Desirably, the intercooler heat exchanger 140 uses water as a cooling medium to cool the air flow exiting the low pressure compressor 114. Intercooler heat exchangers are well known to those skilled in the art and need not be described in further detail herein.

High pressure steam produced in HRSG 108 is routed to a steam header 146 wherein the steam is available for distribution to a steam turbine set 150. In one embodiment, a portion of the steam is routed to a high-pressure part 152 of the turbine 150 through line 154. The steam expands against the high-pressure part 152 and may then be returned to the HRSG 108 where additional superheat is added. The steam then goes back into an intermediate pressure section of the steam turbine set 150 via line 156 and continues its expansion in a low-pressure part of the turbine 158. As is well known in the art, power is generated as the high-pressure steam and low-pressure steam expands against the turbine set 150, and is removed via a power take-off shaft (not shown).

After passing through the low-pressure part 158 of the steam turbine set 150, the exhaust steam is then routed so as to be used as the heat source in the thermal desalination unit 103 of the plant 100. In the illustrated example, the desalination unit 103 is a single-effect distillation plant consisting of a condenser or effect 159. Although a single-effect distillation plant is shown in the schematic, it is to be understood that either a single effect or multiple effect distillation (MED) desalination plant may be integrated in the combined-cycle power generation and desalination plant 100. Additionally, the thermal desalination unit 103 may also use multi-stage flash, membrane distillation, or forward osmosis processes without departing from the scope of the invention. The desalination unit 103 includes a salinous water inlet 160 used to supply raw salinous water to the effect 159, a distilled product water outlet 162 for removing processed freshwater from the effect 159 and supplying it to a freshwater storage system (not shown), and a condensate return 164 to return condensed steam to the HRSG 108. In the illustrated embodiment, the condensate return 164 first leads to a make-up water storage tank 166.

The desalination unit 103 receives steam to boil the raw water in a distillation process, or to heat water in a flash process. The heating steam from the steam turbine set 150 is directed to the effect 159 where the heating steam condenses and a fraction of the salinous water evaporates. The incoming salinous water from the inlet 160 may initially be used as cooling water in a product water condenser 168 used to condense steam in the distilled product water outlet 162. The incoming salinous water is thereby preheated before entering the effect 159. In one embodiment, a portion of the salinous water heated in the product water condenser 168 may also be directed to an RO unit 167 via line 171. The increased temperature of the water leading to the RO unit 167 improves the performance to the RO unit. Reference is made herein to "salinous water", which includes seawater from seas and oceans, but the salinous water introduced at inlet 160 is understood also to include brackish water sources, brines, wastewaters and other sources of reuse or recovered water containing minerals, salts and dissolved solids and the like. The distillate vapor coming out of the effect 159 enters the product water condenser 168 where the steam condenses and becomes product water. The brine remaining at the end is drawn off at 169.

Upon transferring its heat to the salinous water in the effect 159, the exhaust from the steam turbine set 150 condenses and is returned to the HRSG 108 via the make-up water tank 166 where it is again heated to steam in a continuous cycle. The make-up water tank 166 has a first line 170 that leads to the HRSG 108 to complete a steam/condensate HRSG cycle. The make-up water tank 166 also has a line 172 that leads to the intercooler 140 to supply make-up water to the intercooler.

A first hot water line 180 conveys hot water from the intercooler 140 to a reduced atmosphere flash tank 184. In the flash tank 184, a portion of the hot water flashes to steam. A second hot water line 182 conveys hot water from an economizer in the HRSG 108, which captures waste heat from the flue gases, to the flash tank 184. The use of economizers in HRSGs is well known in the art and need not be discussed in further detail. The steam flashed in the flash tank 184 is directed to the effect 159 of the distillation unit 103 via line 185 to increase the mass flow of steam into the effect 159. Water that does not flash to steam in the flash tank 184 is returned to the make-up water inlet tank 166 via return line 186. In one embodiment, the flash tank 184 may be physically integrated into the evaporator of the distillation plant 103. The remaining hot water in the flash tank is returned to the make-up water tank 166. Alternately, a flash tank may not be used and the hot water lines 180 and 182 lead directly to the input line 185 of the distillation unit 103.

In an embodiment that contains an MED plant, a reduced atmosphere flash tank 166 may be located before each effect of the MED plant. Each flash tank 166 could be physically integrated into the corresponding effect of the MED plant. A portion of a hot water stream, such as the hot water from the intercooler 150, is flashed before each effect to increase the mass flow rate of steam into each effect.

Figure 2:
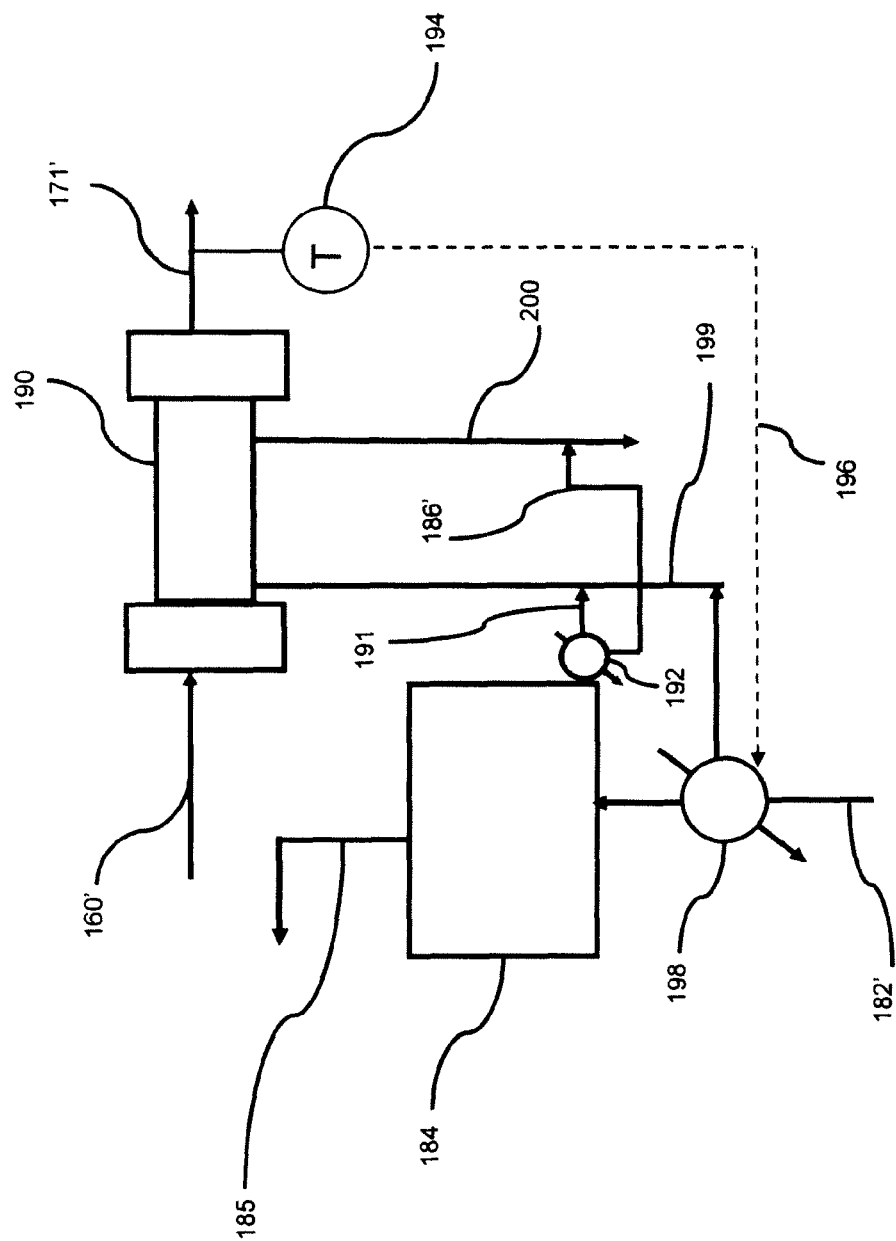
FIG. 2 is a schematic of an embodiment that includes an additional heat exchanger to preheat feed water to the thermal desalination plant or RO unit with the combined-cycle power generation and desalination assembly of FIG. 1.

Turning now to FIG. 2, in an additional embodiment, incoming salinous water from salinous water inlet 160' is warmed in a feed water heat exchanger 190. In one embodiment, the warmed salinous water is to be directed to the RO plant 167 via line 171'. However, it is to be understood that the warmed salinous water may also be directed to thermal desalination unit 103 without departing from the scope of the invention. In the illustrated embodiment, the source of heat in the heat exchanger 190 may come from two different streams. One hot stream is the liquid fraction from the flash tank 184 via line 191. A 3-way valve 192 directs the liquid fraction to the heat exchanger 190 or to the make-up water storage tank 166 (FIG. 1) via line 186'. The other hot stream is the hot water stream originating from the economizer in the HRSG 108 via line 182'. Alternately, a hot water stream originating from the intercooler 140 via line 180' (not shown) may be delivered to the heat exchanger 190. The amount of hot water from the economizer or intercooler 140 that proceeds directly to the feed water heat exchanger 190, and thus bypasses the flash tank 184, is determined by a temperature controller 194 on the feedstream line 171'. The temperature controller 194 sends a signal 196 to a temperature-controlled three-way valve 198 that causes a portion of the hot water to be directed to the heat exchanger 190 instead of to the flash tank 184 via line 199. After passing through the heat exchanger 190, the water is returned to the make-up water tank 166 (FIG. 1) via line 200.

Therefore, a single-effect or multiple-effect distillation unit 103 replaces the condenser of the power generation plant 102. Additional heat sources besides the steam from the steam turbine set 150 is used to further heat the salinous water that enters each effect 159. These heat sources might otherwise be discharged. The plant 100 described herein provides for thoughtful use of these waste heat streams while the net power output of the combined cycle power generation plant 102 is not compromised.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A process for improving the efficiency of a combined-cycle power generation plant and desalination unit, the process comprising:
    supplying exhaust gases from a gas turbine set used to generate electrical power to a heat recovery steam generator (HRSG);
    supplying salinous water into a thermal desalination unit;
    utilizing steam from the HRSG as a first heat source in the thermal desalination unit to produce a distillate vapor and brine from the desalination unit by heat exchange; and
    introducing thermal energy from a second heat source from the combined-cycle power generation plant to the thermal desalination unit to increase the mass flow rate of product water from the desalination unit, said second heat source comprising a heat exchanger fed by condensate from said thermal desalination unit, wherein hot water from said heat exchanger is provided to a reduced atmosphere flash tank to generate steam that is provided to said thermal desalination unit;
    said method further comprising providing a third heat source, wherein said third heat source is an economizer heat exchanger in the HSRG;
    providing heated water from said economizer heat exchanger to said reduced atmosphere flash tank and wherein a portion of said heated water from said economizer heat exchanger is also directed to a salinous feed water heat exchanger via a three-way valve to preheat salinous feed water of a reverse osmosis unit.

2. The process of claim 1 wherein said heat exchanger is an intercooler heat exchanger, wherein said hot water from the intercooler heat exchanger is provided to said reduced atmosphere flash tank and steam flashed in the flash tank is provided to the thermal desalination unit.

3. The process as recited in claim 1 wherein said thermal desalination unit is a multi-effect distillation unit.

* * * * *